(12) United States Patent
Saber et al.

(10) Patent No.: US 11,757,596 B1
(45) Date of Patent: *Sep. 12, 2023

(54) SYSTEM AND METHOD FOR PROCESSING SEMI-PERSISTENTLY SCHEDULED OR DYNAMICALLY SCHEDULED CHANNELS

(71) Applicant: Samsung Electronics Co., Ltd., Suwon-si (KR)

(72) Inventors: Hamid Saber, San Diego, CA (US); Jung Hyun Bae, San Diego, CA (US)

(73) Assignee: Samsung Electronics Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/978,003

(22) Filed: Oct. 31, 2022

Related U.S. Application Data

(63) Continuation of application No. 16/994,497, filed on Aug. 14, 2020, now Pat. No. 11,490,411.

(60) Provisional application No. 62/937,057, filed on Nov. 18, 2019.

(51) Int. Cl.
| | |
|---|---|
| *H04L 5/00* | (2006.01) |
| *H04L 1/1812* | (2023.01) |
| *H04W 72/23* | (2023.01) |
| *H04W 84/04* | (2009.01) |

(52) U.S. Cl.
CPC .......... *H04L 5/0055* (2013.01); *H04L 1/1812* (2013.01); *H04W 72/23* (2023.01); *H04W 84/042* (2013.01)

(58) Field of Classification Search
CPC .. H04W 72/23; H04W 84/042; H04L 1/1812; H04L 5/0055
See application file for complete search history.

(56) References Cited

U.S. PATENT DOCUMENTS

| | | |
|---|---|---|
| 2015/0103768 A1 | 4/2015 | Chen et al. |
| 2016/0165591 A1 | 6/2016 | Li et al. |
| 2018/0270798 A1 | 9/2018 | Park et al. |
| 2019/0082456 A1 | 3/2019 | Kim et al. |
| 2020/0146028 A1 | 5/2020 | Yang et al. |
| 2020/0205141 A1 | 6/2020 | Khoshnevisan et al. |

FOREIGN PATENT DOCUMENTS

| | | |
|---|---|---|
| EP | 3754875 A1 | 12/2020 |
| WO | WO 2019/050363 A1 | 3/2019 |
| WO | WO 2019/159298 A1 | 8/2019 |

OTHER PUBLICATIONS

Wilus Inc: "Remaining Issues on HARQ-ACK codebook construction," 3GPP TSG RAN WG1 Meeting #93, May 2018, 5 pages.

(Continued)

*Primary Examiner* — Farid Seyedvosoghi
(74) *Attorney, Agent, or Firm* — Lewis Roca Rothgerber Christie LLP

(57) ABSTRACT

A method for processing multiple overlapping channels includes: transmitting, by a base station comprising a processor and a memory, a channel comprising a plurality of physical downlink shared channels (PDSCH) in a slot, the PDSCHs being organized into one or more sub-groups of overlapping PDSCHs; and receiving, by the base station and from a mobile station, an acknowledgment (ACK) or a negative acknowledgment (NACK) for two or more overlapping PDSCHs in at least one of the one or more sub-groups in the slot.

20 Claims, 9 Drawing Sheets

(56) References Cited

OTHER PUBLICATIONS

ZTE: "URLLC/eMBB differentiation and enhancement to semi-static ACK/NACK codebook," 3GPP TSG RAN WG1 Meeting #95, Nov. 2018, pp. 1-4.
EPO Extended Search Report dated Feb. 26, 2021, issued in corresponding European Patent Application No. 20196382.4 (13 pages).

SYSTEM AND METHOD FOR PROCESSING SEMI-PERSISTENTLY SCHEDULED OR DYNAMICALLY SCHEDULED CHANNELS

CROSS-REFERENCE TO RELATED APPLICATION(S)

This application is a continuation of U.S. patent application Ser. No. 16/994,497, filed Aug. 14, 2020, which claims priority to and the benefit of U.S. Provisional Patent Application No. 62/937,057, filed in the United States Patent and Trademark Office on Nov. 18, 2019, the entire contents of both of which are incorporated herein by reference.

FIELD

Aspects of embodiments of the present disclosure relate to systems and methods for processing semi-persistently scheduled or dynamically scheduled channels in cellular communications protocols.

BACKGROUND

In cellular communications protocols, such as Release 15 of the 3rd Generation Partnership Project (3GPP) Fifth Generation New Radio (5G-NR) specifications for mobile networks, downlink traffic from a base station to user equipment (e.g., a smartphone) is wirelessly transmitted in signals that include a physical downlink shared channel (PDSCH) which can be either dynamically scheduled (dynamic grant or DG) or semi-persistently scheduled (SPS).

SUMMARY

Aspects of embodiments of the present disclosure relate to cellular communication protocols, including systems and methods implemented in user equipment (UE) for processing semi-persistently scheduled (SPS) or dynamically scheduled (or dynamic grant or DG) channels transmitted by a base station (or g node B or gNB).

Some aspects of embodiments of the present disclosure relate to systems and methods for defining UE processing capabilities in the case of multiple SPS physical downlink shared channel (PDSCH) configurations per bandwidth part (BWP) per serving cell, as well as overlapping SPS PDSCH occasions, by limiting the number of SPS PDSCH occasions the UE is expected to decode within a sub-group of overlapping SPS PDSCHs, including circumstances where SPS PDSCHs overlap with a DG PDSCH.

Some aspects of embodiments of the present disclosure further relate to a semi-static hybrid automatic repeat request acknowledgment (HARQ-ACK) codebook that is capable of representing the case of multiple overlapping SPS PDSCHs.

According to one embodiment of the present disclosure, a method for processing multiple overlapping channels includes: receiving, at a mobile station including a processor and a memory, a channel including a plurality of physical downlink shared channels (PDSCH) in a slot; determining, by the processor of the mobile station, one or more sub-groups of PDSCHs in the slot, each sub-group including one or more overlapping PDSCHs overlapping in a time domain; selecting, by the processor of the mobile station, two or more PDSCHs of at least one sub-group of the one or more sub-groups; generating, by the processor of the mobile station, acknowledgement bits of the selected two or more PDSCHs of the at least one sub-group; and transmitting, by the mobile station, the acknowledgement bits of the two or more PDSCHs of the at least one sub-group to a base station.

The acknowledgment bits may be included in two or more containers corresponding to the at least one sub-group, the two or more containers being included in a hybrid automatic repeat request acknowledgment (HARQ-ACK) codebook.

The acknowledgement bits may include an acknowledgment (ACK) or a negative acknowledgment (NACK) value corresponding to one of the selected two or more PDSCHs.

The method may further include decoding, by the mobile station, the selected two or more PDSCHs.

According to one embodiment of the present disclosure, a method for processing multiple overlapping channels includes: transmitting, by a base station including a processor and a memory, a channel including a plurality of physical downlink shared channels (PDSCH) in a slot, the PDSCHs being organized into one or more sub-groups of overlapping PDSCHs; and receiving, by the base station and from a mobile station, an acknowledgment (ACK) or a negative acknowledgment (NACK) for two or more overlapping PDSCHs in at least one of the one or more sub-groups in the slot.

The method may further include: receiving, by the base station and from the mobile station, a report of a number of overlapping semi-persistently scheduled (SPS) PDSCHs that the mobile station is capable of receiving in a sub-group; and setting, by the base station, a number of acknowledgment containers per sub-group in the acknowledgement based on the number of overlapping SPS PDSCH receptions that the mobile station is capable of receiving in a sub-group.

The method may further include: receiving, by the base station and from the mobile station, a report of a number of overlapping semi-persistently scheduled (SPS) PDSCHs and dynamic grant (DG) PDSCHs that the mobile station is capable of receiving in a sub-group; and setting, by the base station, a number of acknowledgment containers of the sub-group in the acknowledgement based on the number of overlapping PDSCH receptions that the mobile station is capable of receiving in a sub-group.

The method may further include: determining, by the base station, which of the two or more overlapping PDSCHs of the at least one sub-group will be decoded by the mobile station, and setting, by the base station, a timeout period between the transmitting the two or more overlapping PDSCHs of the at least one sub-groups and the receiving the acknowledgement based on a processing time based on the determined two or more overlapping PDSCHs.

The determined two or more overlapping PDSCHs may include N of PDSCHs, where N is greater than 1, and the base station may allocate additional processing time for each of the N PDSCHs of the at least one sub-group.

The acknowledgment may include a hybrid automatic repeat request acknowledgment (HARQ-ACK) codebook including two or more containers corresponding to the two or more overlapping PDSCHs of the at least one sub-group of the slot.

According to one embodiment of the present disclosure, a method for processing multiple channels includes: receiving, at a mobile station including a processor and a memory, a channel including a plurality of physical downlink shared channels (PDSCH) in a slot; determining, by the processor of the mobile station, one or more sub-groups of PDSCHs in the slot, each sub-group including one or more overlapping PDSCHs overlapping in a time domain; selecting, by the processor of the mobile station, two or more overlapping PDSCHs of a j-th sub-group of the one or more sub-groups; and decoding, by the mobile station, the selected two or more overlapping PDSCHs.

The selecting the two or more overlapping PDSCHs may include: determining a number $\alpha_j$ of scheduled dynamic grant (DG) PDSCHs in the j-th sub-group; selecting the scheduled DG PDSCHs; and selecting $M_j$-$\alpha_j$ PDSCHs from among remaining PDSCHs of j-th sub-group, where $M_j$ is the number of overlapping PDSCH occasions the mobile station is capable of decoding in the j-th sub-group. In some embodiments, $\alpha_j$ may be zero. In some embodiments, $\alpha_j$ may be greater than or equal to one.

Each of the remaining PDSCHs may be a semi-persistently scheduled (SPS) PDSCH, each SPS PDSCH being associated with a corresponding SPS configuration index, and the selecting the $M_j$-$\alpha_j$ PDSCHs from among the remaining PDSCHs of j-th sub-group may be based on the corresponding SPS configuration index.

Each SPS PDSCH may be activated by a corresponding scheduling activation downlink control information (DCI), the corresponding SPS configuration index of each SPS PDSCH may be assigned based on an order in which the corresponding scheduling activation DCI of the SPS PDSCH is transmitted to the mobile station, and the $M_j$-$\alpha_j$ PDSCHs may be selected from among the remaining PDSCHs of j-th sub-group based on SPS configuration index.

The method may further include: selecting, by the processor of the mobile station, a semi-persistently scheduled (SPS) PDSCH of a i-th sub-group of the one or more sub-groups, where i≠j, wherein the selected SPS PDSCH of the i-th sub-group overlaps with an SPS PDSCH of the j-th sub-group from among the selected two or more overlapping PDSCHs of the j-th sub-group; comparing, by the processor of the mobile station, the corresponding SPS configuration index of the SPS PDSCH of the j-th sub-group and the corresponding SPS configuration index of the SPS PDSCH of the i-th sub-group; and dropping, by the processor of the mobile station, one of the SPS PDSCH of the j-th sub-group and the SPS PDSCH of the i-th sub-group based on the comparison.

The method may further include selecting, by the processor of the mobile station, a dynamic grant (DG) PDSCH of a i-th sub-group of the one or more sub-groups, where i≠j, wherein the selected DG PDSCH of the i-th sub-group overlaps with an SPS PDSCH of the j-th sub-group from among the selected two or more overlapping PDSCHs of the j-th sub-group; and dropping, by the processor of the mobile station, the SPS PDSCH of the j-th sub-group.

The method may further include selecting, by the processor of the mobile station, a semi-persistently scheduled (SPS) PDSCH of a i-th sub-group of the one or more sub-groups, where i≠j, wherein the selected SPS PDSCH of the i-th sub-group overlaps with a dynamic grant (DG) PDSCH of the j-th sub-group; and dropping, by the processor of the mobile station, the SPS PDSCH of the i-th sub-group.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

In cellular communications, such as Release 15 (Rel-15) of the 3rd Generation Partnership Project (3GPP) new radio (NR) technology (e.g., fifth generation new radio or 5G-NR) for mobile networks, downlink traffic from a base station or g Node B (gNB) to a mobile station or user equipment (e.g., a smartphone) is transmitted in physical downlink shared channels (PDSCHs) which can be either dynamically scheduled (dynamic grant or DG) or semi-persistently scheduled (SPS).

A DG PDSCH is scheduled by a scheduling physical downlink control channel (PDCCH) which is used to convey the downlink control information (DCI) to the user equipment (UE) such as a smartphone, a tablet computer, a Wi-Fi hotspot, and the like. The DCI includes, among other information, the time and frequency resources in which UE can receive the DG PDSCH. According to Rel-15 of the 5G-NR standards, every DG PDSCH can only be received by first receiving the scheduling DCI.

Release-15 of the 5G-NR standards also define a semi-persistently scheduled (SPS) PDSCH, which makes it possible for the UE to receive PDSCHs without a corresponding scheduling DCI. In Release-15, SPS PDSCH is supported to provide contiguous downlink transmission without the need to schedule every individual PDSCH via a separate DCI.

For example, in SPS PDSCH, a base station (or g Node B or gNB) configures the UE with one or more SPS configurations via radio resource control (RRC) messages. A SPS configuration information element (IE) per serving cell per bandwidth part (BWP) includes periodicity, physical uplink control channel (PUCCH) resource information and other information required for SPS operation (see, e.g., 3GPP Technical Specification 38.331 Clause 6). For example, a SPS configuration information element may specify a periodicity for the SPS PDSCH occasions, e.g., how frequently the SPS PDSCH can be received. For example, under some circumstances, the minimum periodicity is 10 ms (10 slots for subcarrier spacing of 15 KHz).

Rel-15 of the 5G-NR supports at most one active SPS PDSCH configuration per bandwidth part (BWP) per serving cell. Furthermore, there can be at most one serving cell within each cell group that can be configured with an SPS PDSCH configuration. To provide more flexibility to the uRLLC UE, including lower latency, aspects of embodiments of the present disclosure relate to supporting multiple active SPS configurations per BWP per serving cell. Moreover, aspects of embodiments of the present disclosure allow the configuration of more than one cell with SPS configurations within each cell group.

Figure 1:
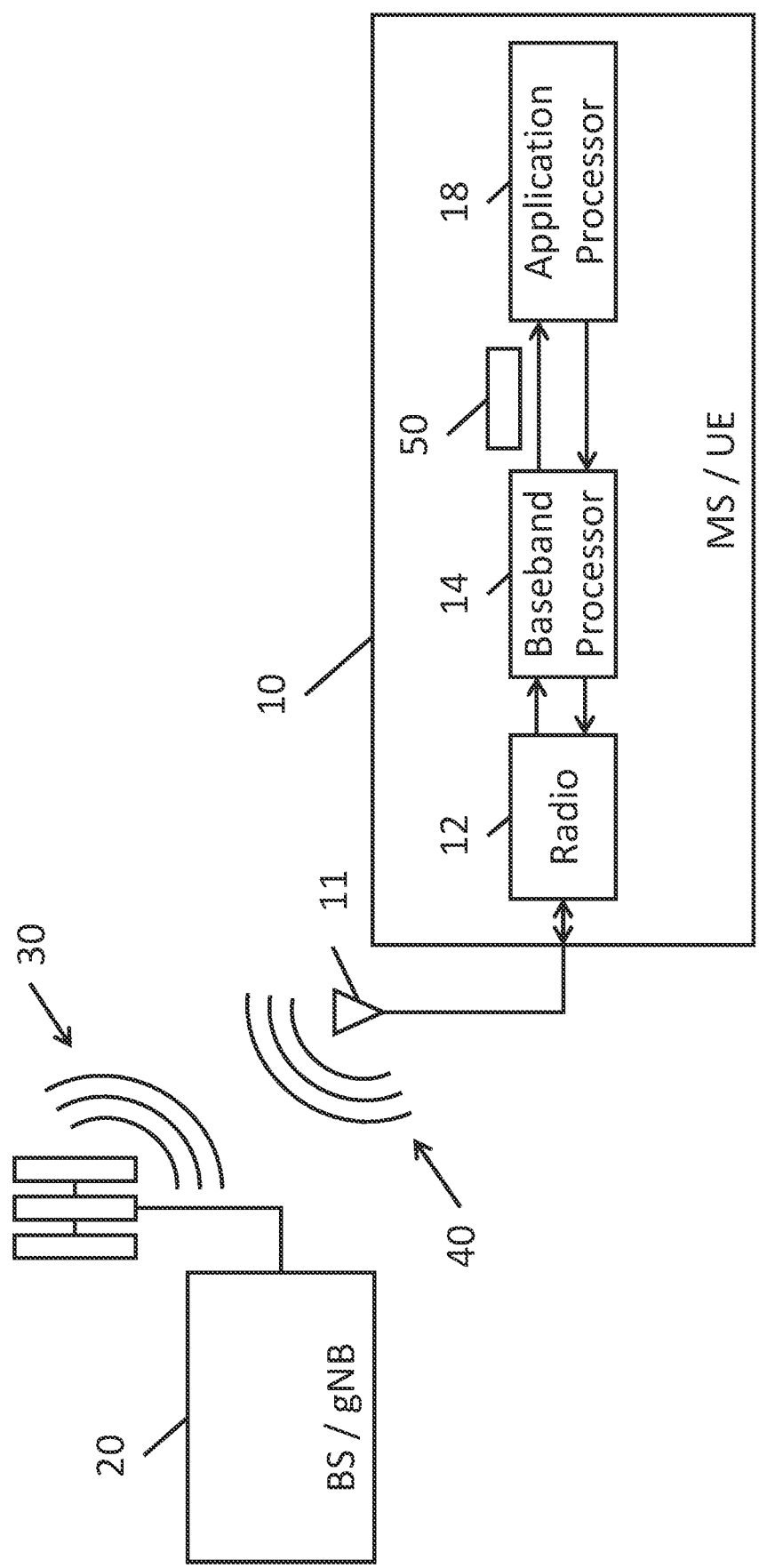
FIG. 1 is a schematic block diagram of a wireless communication system in which a base station (or g Node B or gNB) communicates with a mobile station (or user equipment or UE).

FIG. 1 is a schematic block diagram of a wireless communication system in which a base station (or g Node B or gNB) communicates with a mobile station (or user equipment or UE). As shown in FIG. 1, a mobile station 10 may include an antenna 11 that is configured to receive a downlink electromagnetic signal 30 (e.g., transmitted by a base station 20). The downlink electromagnetic signal 30 transmitted by the base station 20 includes one or more downlink channels such as PDSCHs. As shown in FIG. 1, the mobile station 10 may also transmit an uplink electromagnetic signal 40 to be received by the base station 20, where the uplink electromagnetic signal 40 includes one or more uplink channels such as a PUCCH.

The received downlink analog signal 30 may be supplied to a radio 12, which may apply various signal processing operations to the received analog signal to generate a digital signal, which may be further processed by baseband processor 14. In some circumstances, the radio 12 and the baseband processor may be integrated as a single unit. The baseband processor 14 generates digital information 50 decoded from the received signal 30 and may supply the decoded information, along with other information about the state of the communication, to an application processor (AP) 18. The digital information or data 50 may include a digital bitstream, to be supplied for consumption by applications running on the application processor 18 of the mobile station 10. The application processor 18 may execute an operating system (e.g., Google® Android®, Tizen™, Apple® iOS®, or the like) and the applications (or apps) may include, for example, a voice calling application, a video conferencing application, an email application, a web browser, or the like. The application processor 18 may also control aspects of the communication with the base station 20 via the baseband processor 14 and the radio 12.

Figure 2:
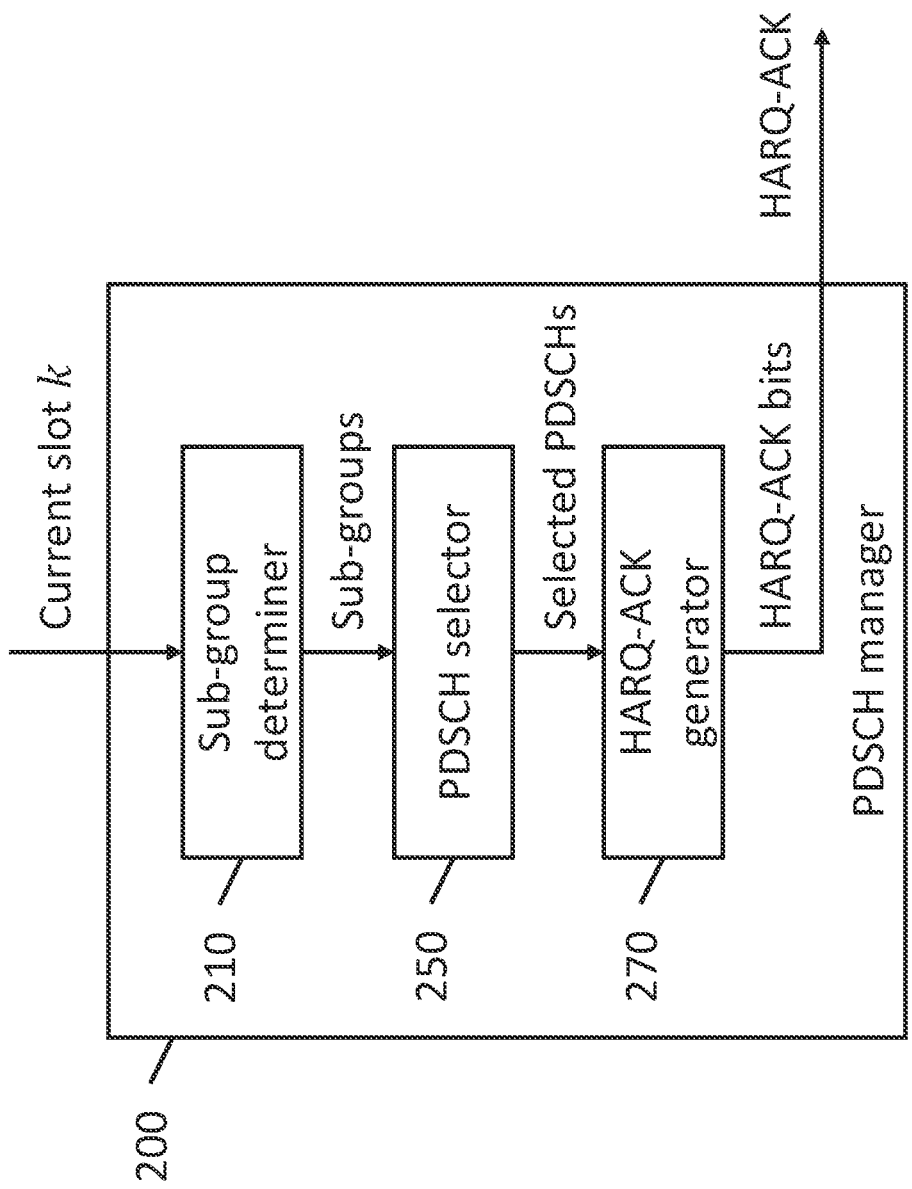
FIG. 2 is a block diagram illustrating a physical downlink shared channel (PDSCH) manager according to one embodiment of the present disclosure.

FIG. 2 is a block diagram illustrating a physical downlink shared channel (PDSCH) manager 200 according to one embodiment of the present disclosure. According to various embodiments of the present disclosure, the application processor 18 and/or the baseband processor 14 may implement the PDSCH manager. Referring to FIG. 2, the PDSCH manager includes a sub-group determiner 210 configured to group PDSCHs of a current slot k into one or more sub-group, a PDSCH selector 250 configured to select one or more PDSCHs to be received, and hybrid automatic repeat request acknowledgment (HARQ-ACK) generator 270 configured to generate HARQ-ACK bits to acknowledge (or, in some circumstances, negative-acknowledge) the reception of the selected PDSCHs (e.g., where the HARQ-ACK may be transmitted in a PUCCH on an uplink electromagnetic signal 40 from the mobile station 10 to the base station 20).

In various embodiments of the present disclosure, the components of the PDSCH manager 200, such as the sub-group determiner 210, the PDSCH selector 250, and the HARQ-ACK generator 270, may be implemented in one or more processing circuits (e.g., a radio baseband processor (BP or BBP), a central processing unit (CPU) or application processor (AP), a microcontroller, a digital signal processor (DSP), a field programmable gate array (FPGA), or an application specific integrated circuit (ASIC)) of a digital radio, where various portions of various blocks may be implemented in the same circuit (e.g., on the same die or in a same package) or in different circuits (e.g., on different dies or in different packages, connected over a communication bus).

Figure 3:
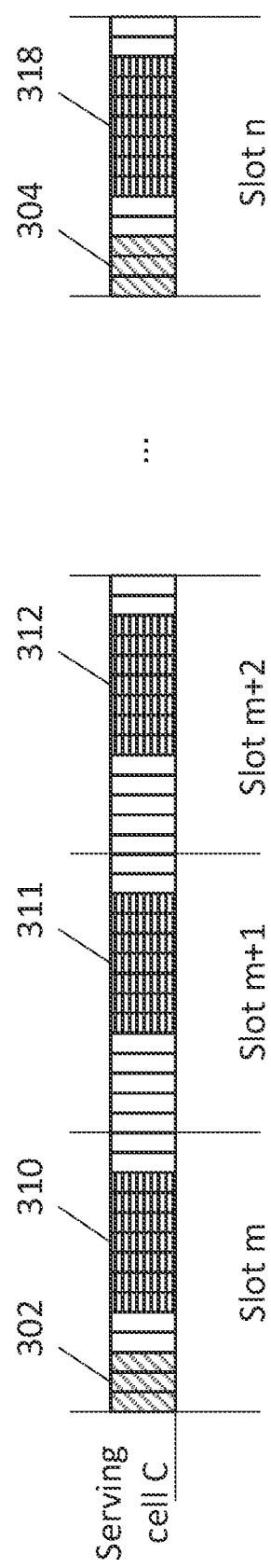
FIG. 3 is a schematic diagram illustrating the arrangement of a semi-persistently scheduled physical downlink shared channel (SPS PDSCHs) occasions over multiple slots of a serving cell.

FIG. 3 is a schematic diagram illustrating the arrangement of a semi-persistently scheduled physical downlink shared channel (SPS PDSCHs) occasions over multiple slots of a serving cell. A SPS configuration is activated by an activation DCI 302 which, in general can be any of the DCI formats which schedule a DG PDSCH with some additional validation mechanism performed, (see, e.g., 3GPP Technical Specification 38.213 Clause 10.2). Compared to a DCI scheduling a DG PDSCH, the 3GPP 5G-NR specification states that an SPS activation DCI is scrambled by configured grant radio network temporary identifier (CS-RNTI) and some specific DCI fields are specially used for identification of SPS activation, including new data indicator (NDI), hybrid automatic repeat request (HARQ) process number (HPN) and redundancy version (RV). The SPS activation DCI schedules the first SPS PDSCH occasion 310 in slot m in a manner similar to a DG PDSCH.

As shown in FIG. 3 the SPS activation DCI 302 is received in slot m and the SPS activation DCI indicates/schedules the first SPS PDSCH occasion 310 in slot m. The next SPS PDSCH occasions are determined according to the periodicity set by the SPS activation DCI 302 which, in this example, is a periodicity of 1 slot, as well as the time and frequency domain resource indicated by the SPS activation DCI 302. For example, within the SPS slots, the time and frequency resources follow that of the first SPS occasion (e.g., at the same offsets from the beginning of their respective slots). As another example, if the periodicity were set to 2 slots, then a first SPS PDSCH occasion would be scheduled in slot m, no SPS PDSCH occasion would be scheduled for slot m+1, and a second SPS PDSCH occasion would be scheduled in slot m+2, and so on. As shown in FIG. 3, no corresponding SPS activation DCI is needed in slot m+1 or in slot m+2 to receive the respective SPS PDSCH occasion 311 or SPS PDSCH occasion 312.

As shown in FIG. 3, a release DCI 304 in slot n (where n>m) releases the active SPS configuration. Although the release DCI 304 technically does not schedule a resource, in some embodiments, the release DCI 304 is associated with one last PDSCH occasion 318. In some embodiments, the last PDSCH occasion 318 is only used for semi-static HARQ-ACK codebook construction, in which case the user equipment may assume that there will be no SPS PDSCH reception during this last PDSCH occasion 318. According to Rel-15 of the 3GPP 5G-NR standards, there can be up to one active SPS configuration per bandwidth part (BWP) of a serving cell.

Aspects of embodiments of the present disclosure relate to providing more flexibility to the base station (or g node B or gNB) to schedule Ultra Reliable Low Latency Communications (uRLLC) and to satisfy the latency requirements, by allowing multiple active SPS configurations per serving cell per BWP. By allowing multiple active SPS configurations per BWP of a serving cell, it is possible that multiple active SPS occasions overlap in time and/or frequency in one slot.

Figure 4:
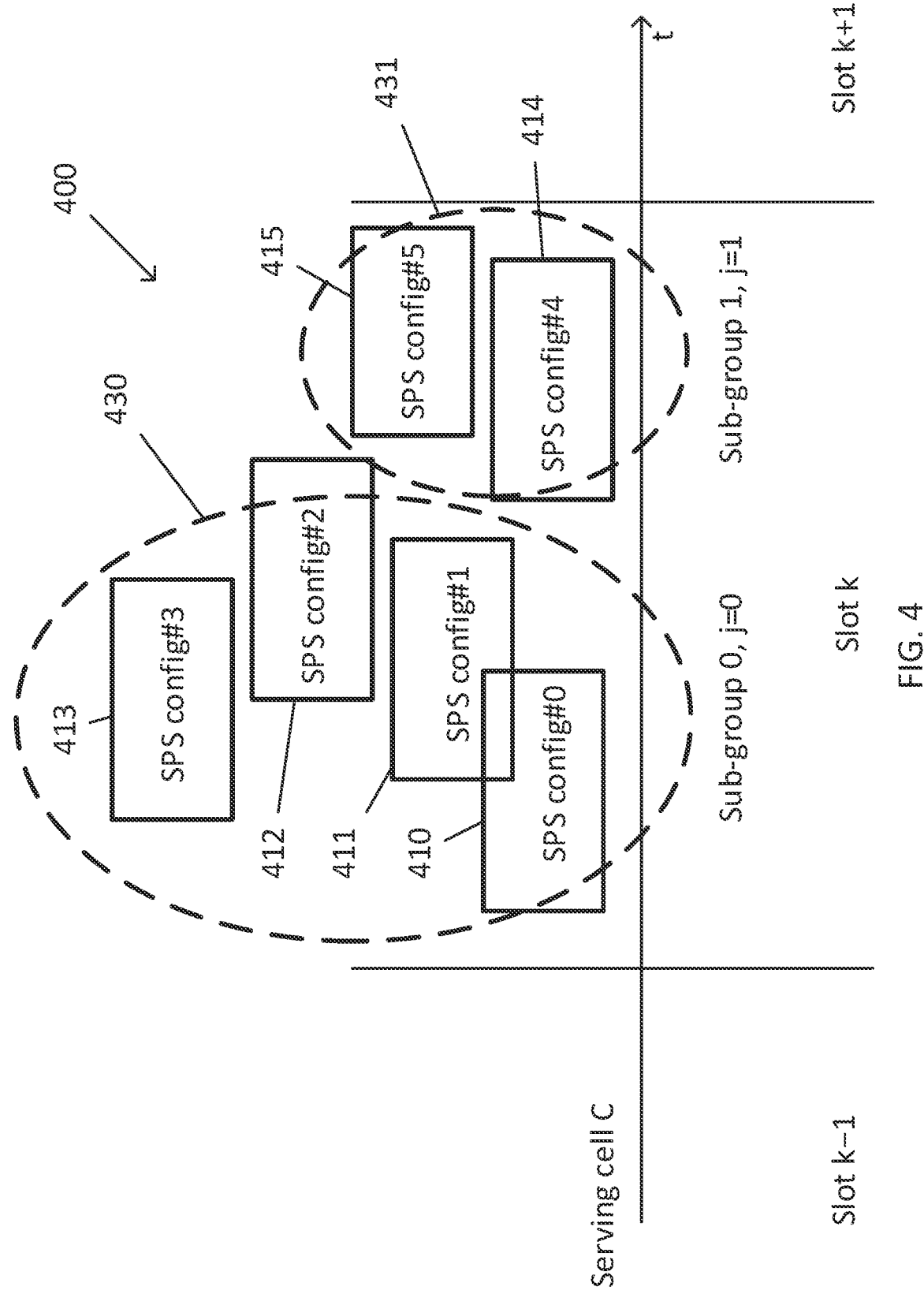
FIG. 4 is a schematic diagram illustrating a set of overlapping SPS PDSCH occasions and the corresponding type-1 hybrid automatic repeat request acknowledgment (HARQ-ACK) codebook sub-groups of the PDSCH occasions.

FIG. 4 depicts an example of a slot k of serving cell C in which six SPS PDSCH occasions 400 are scheduled to occur, some of which overlap. The horizontal axis in FIG. 4 indicates the time domain or time (t), and the vertical axis generally represents diversity in a different domain, such as the frequency domain and/or code division domain. The six SPS PDSCH occasions are labeled SPS config #0 410, SPS config #1 411, SPS config #2 412, SPS config #3 413, SPS config #4 414, and SPS config #5 415. In the embodiment described herein, the SPS PDSCH occasions are assigned indices in the order in which each of the SPS PDSCH occasions were scheduled by their corresponding activation DCIs (e.g., the mobile station received an activation DCI to schedule SPS config #0 410 before receiving any of the activation DCIs that scheduled SPS config #1, SPS config #1 411, SPS config #2 412, SPS config #3 413, SPS config #4 414, and SPS config #5 415). In other embodiment of the present disclosure, the SPS PDSCH occasions are assigned their corresponding indices in accordance with a different rule (e.g., a combination of priority and order in which they were scheduled).

While FIG. 4 shows the SPS PDSCH occasions 400 scheduled for slot k, other slots may have different SPS PDSCH occasions scheduled, depending on the periodicity of the SPS PDSCHs. For example, one SPS configuration may schedule an SPS PDSCH with a periodicity of 2 and another SPS configuration may schedule an SPS PDSCH with a periodicity of 3. As such, these two configurations with cause respective SPS PDSCH occasions to appear in the same slot once every six slots (6 being the lowest common multiple of 2 and 3). As such, slot k−1 and slot k+1 may have different SPS occasions than the example slot k shown in FIG. 4.

In order to handle these multiple active SPS configurations, various aspects of embodiments of the present disclosure relate to: a hybrid automatic repeat request acknowledgment (HARQ-ACK) codebook that is capable of acknowledging multiple active overlapping PDSCHs; systems and methods for determining which of the multiple PDSCHs are to be acknowledged; and modifying or relaxing the permitted processing time for processing a PDSCH.

Hybrid Automatic Repeat Request Acknowledgment (HARQ-ACK) Codebook and Overlapping Physical Downlink Shared Channels (PDSCHs)

Release 15 of the 5G-NR standards describe a semi-static hybrid automatic repeat request acknowledgment (HARQ-ACK) codebook, and can provide HARQ-ACK bits for SPS PDSCH bits (e.g., for the UE to acknowledge receipt of SPS PDSCHs). These codebooks include type-1 HARQ-ACK codebooks, in which all possible time-domain resource allocations given by the time-domain resource allocation (TDRA) table are sub-grouped based on their overlap (as described in more detail below) and the type-1 HARQ-ACK codebook includes one container for HARQ-ACK bits per sub-group. The TDRA table includes a row for each SPS occasions representing their corresponding time-domain resources, as indicated by their corresponding activation DCIs. In FIG. 4, it is assumed the TDRA table has six rows, and each of the six active SPS configurations has time-domain resources indicated by each row of the TDRA table.

In Release-15 of the 3GPP 5G-NR standards, these HARQ-ACK codebooks are limited to the case of at most one SPS PDSCH occasion per BWP per serving cell. In addition, in the case of overlap between one DG PDSCH and one SPS PDSCH, the specification states that the UE is only required to decode the DG PDSCH. However, all these behaviors work for at most one SPS PDSCH occasion within the BWP of a cell and at most one SPS PDSCH occasion within a set of overlapping SPS PDSCH occasions.

FIG. 4 is a schematic diagram illustrating a set of overlapping SPS occasions and the corresponding type-1 hybrid automatic repeat request acknowledgment (HARQ-ACK) codebook sub-groups. Each of the SPS occasions 400 depicted boxes in FIG. 4 are the PDSCH candidates where base station 20 may possibly transmit the PDSCHs. In some instances, these candidates may be empty, for example, the base station 20 need to transmit a PDSCH for the UE in each scheduled SPS occasion. Each sub-group of overlapping PDSCHs can be defined according to Type-1 codebook sub-group. In particular, a PDSCH occasion with earliest last symbol is chosen and every other PDSCH which overlaps with this PDSCH is grouped into the first sub-group in slot. Excluding the PDSCHs in the first sub-group, a PDSCH with earliest last symbol is chosen and every other PDSCHs overlapping with this PDSCH is grouped into the second sub-group in the slot and so on (see, e.g., 3GPP Technical Specification 38.213, sub-clause 9.1.2).

In the particular example shown in FIG. 4, SPS config #0 410 has the earliest last symbol (e.g., the right edge of the box 410 is the earliest in time among all of the SPS PDSCH occasions 400). Every other PDSCH occasion which overlaps in time with SPS config #0 410 is then considered as part of the same sub-group as SPS config #0 410. Referring to FIG. 4, two PDSCH occasions overlap if a vertical line can be drawn through both boxes representing the PDSCH occasions. In the example shown in FIG. 4, SPS config #1 411, SPS config #2 412, and SPS config #3 413 all overlap in time with SPS config #0 and therefore are part of a sub-group. Of the remaining PDSCH occasions, SPS config #4 414 has the earliest last symbol (e.g., the right edge of SPS config #4 414 is earlier in time than the right edge of SPS config #5 415). SPS config #5 415 overlaps in time with SPS config #4 414 and therefore is part of the same sub-group as SPS config #4 414, and there are no remaining sub-groups.

Accordingly, based on Release 15 of the 5G-NR standards, in the type-1 HARQ-ACK codebook, SPS occasions for configurations 0 through 3 (SPS config #0 410, SPS config #1 411, SPS config #2 412, and SPS config #3 413) are sub-grouped together in sub-group #0 430 and SPS occasions for configurations 4 and 5 (SPS config #4 414 and SPS config #5 415) are sub grouped together in sub-group #1 431, thereby forming two sub-groups.

Release 15 of the 5G-NR standards specifies that a type-1 codebook creates one HARQ-ACK container for each sub-group—in this case of two sub-groups 430 and 431, the type-1 codebook includes two HARQ-ACK containers. Release 15 of the 5G-NR standards specifies that each container provides one set of HARQ-ACK bits intended for one PDSCH reception. This is because Release 15 of the 5G-NR standards assumes that, for each sub-group, only one actual PDSCH is received (e.g., the remaining PDSCHs are dropped and are not received by the UE). In more detail, clause 9 of 3GPP Technical Specification 38.213 includes pseudo-code for the Type-1 HARQ-ACK codebook, where the pseudo-code includes the sub-group definition. At each sub-group, the pseudo-code specifies that exactly one HARQ-ACK/NACK (A/N) bit is generated, regardless of the PDSCH reception. For example, in slot k shown in FIG. 4, one bit is generated for sub-group 0 430, and one bit is generated for sub-group 1 431. In other words, there is one "container" for each sub-group. The values of the HARQ A/N bits are, by default, set to a value of 0 (e.g., NACK).

As noted above, a base station 20 is not required to transmit a PDSCH during every SPS PDSCH occasion. However, if the base station 20 does transmit a PDSCH during a scheduled SPS PDSCH occasion, the UE 10 attempts to decode the PDSCH candidate and, upon successful decoding, generates a valid HARQ ACK/NACK (A/N) bit for the sub-group; ACK for successful decoding and NACK for failed decoding.

However, some UE may be capable of receiving multiple PDSCH occasions in a given sub-group. Accordingly, some aspects of embodiments of the present disclosure relate to a HARQ-ACK codebook that is capable of acknowledging multiple PDSCH receptions in a same sub-group. In some embodiments, a HARQ-ACK codebook includes one or more containers for each sub-group, where each container includes HARQ-ACK bits corresponding to or associated with a different PDSCH occasion of the sub-group.

In addition, in the case where a UE can receive multiple PDSCHs (SPS PDSCHs or DG PDSCHs) of a sub-group, some aspects of embodiments of the present disclosure relate to systems and methods for determining UE behavior in processing a set of overlapping SPS PDSCHs and/or DG PDSCHs, including which PDSCHs a UE is to decode and which PDSCHs UE is to report the HARQ-ACK bits for. In some embodiments, this determination may be made deterministically, e.g., such that the base station or gNB 20 can reliably predict which PDSCHs will be received (e.g., processed) by the UE and which PDSCHs will be ignored or dropped.

Having multiple active SPS PDSCH configurations reduces the latency of Ultra Reliable Low Latency Communications (uRLLC) services and provides the base station or gNB 20 with increased flexibility to schedule different or same service types with different SPS configurations. Aspects of embodiments of the present disclosure relate to defining user equipment behavior to process SPS PDSCHs and DG PDSCHs in case of overlaps. If this behavior were not defined, high priority SPS PDSCHs may be dropped, resulting in a negative impact on the reliability and/or latency of uRLLC. Similarly, enabling the HARQ-ACK codebook to work for multiple SPS PDSCH configurations per BWP per serving cell improves the performance of the communications between the base station 20 and the UE 10.

Assuming that the UE 10 is capable of receiving of multiple overlapping SPS PDSCHs or DG PDSCHs, aspects of embodiments of the present disclosure relate to systems and methods for generating valid HARQ-ACK bits for each reception of a PDSCH in a sub-group. To this end, aspects of embodiments of the present disclosure relate to a HARQ-ACK codebook that allows multiple HARQ-ACK containers within each sub-group.

According to some embodiments of the present disclosure, the 3GPP 5G-NR Release-15 HARQ-ACK codebook is modified such that, for each sub-group j of overlapping PDSCH candidates (or occasions), $M_j$ HARQ-ACK containers are reserved.

Figure 5A:
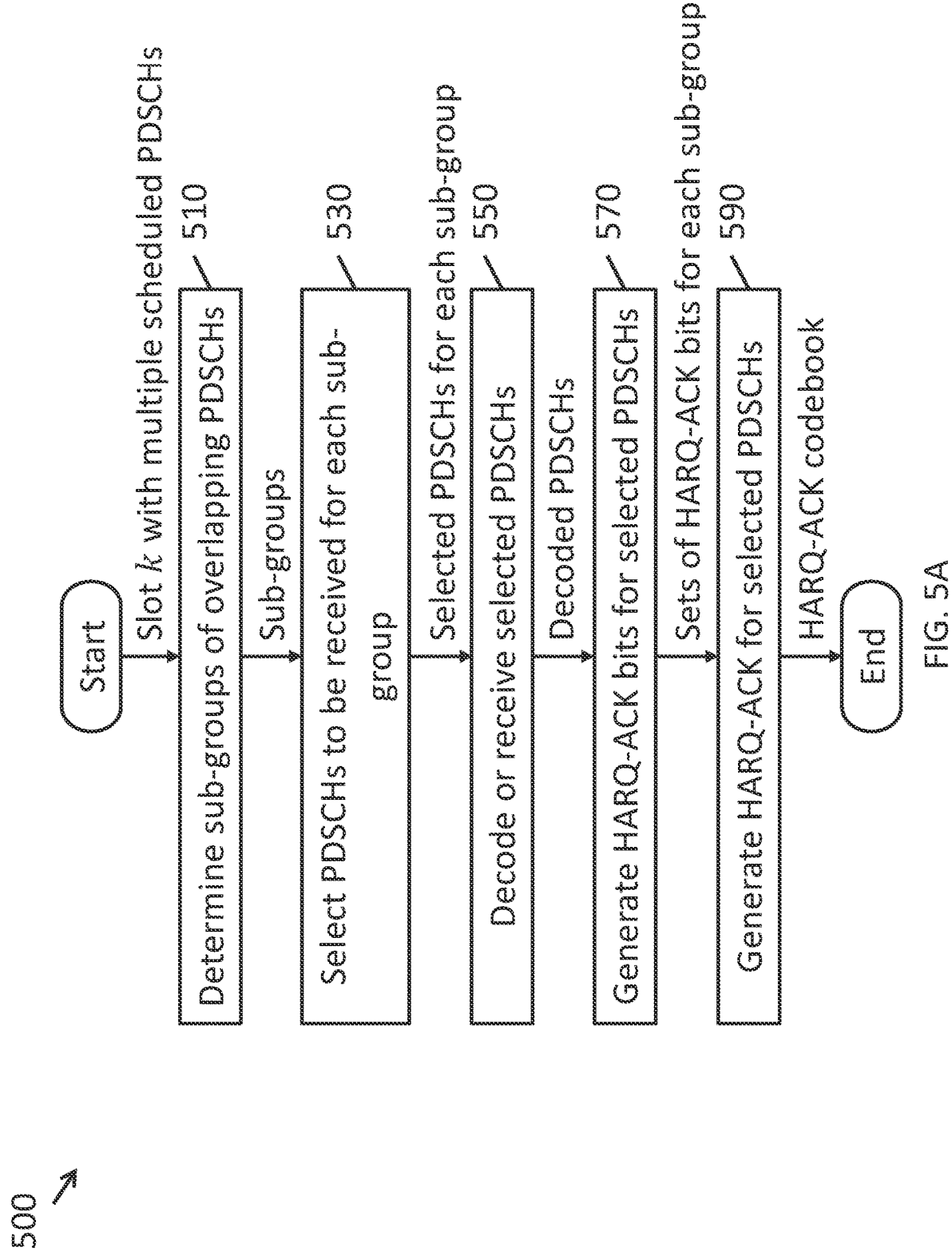
FIG. 5A is a flowchart of a method for receiving or decoding multiple overlapping PDSCHs in a slot having multiple PDSCHs according to one embodiment of the present disclosure.

FIG. 5A is a flowchart of a method for receiving multiple overlapping PDSCHs in a slot having multiple PDSCHs according to one embodiment of the present disclosure. Referring to FIG. 5A, in operation 510, the sub-group determiner 210 of the PDSCH manager 200 of the UE 10 analyzes a slot k that has multiple scheduled PDSCHs (e.g., SPS PDSCHs and possibly one or more DG PDSCHs) and determines sub-groups of the PDSCHs in the slot.

In some embodiments, each sub-group of overlapping PDSCHs is defined according to Type-1 codebook sub-group (see, e.g., 3GPP Technical Specification 38.213). For example, in a manner similar to that described above with respect to FIG. 4, a PDSCH with earliest last symbol is chosen and every other PDSCH which overlaps with this PDSCH is grouped into the first sub-group in slot. Excluding the PDSCHs in the first sub-group, a PDSCH with earliest last symbol is chosen and every other PDSCHs overlapping with this PDSCH is grouped into the second sub-group in the slot and so on.

The sub-group determiner 210 of the PDSCH manager 200 then analyzes the sub-groups to determine which PDSCH occasions within each sub-group are to be received.

Figure 5B:
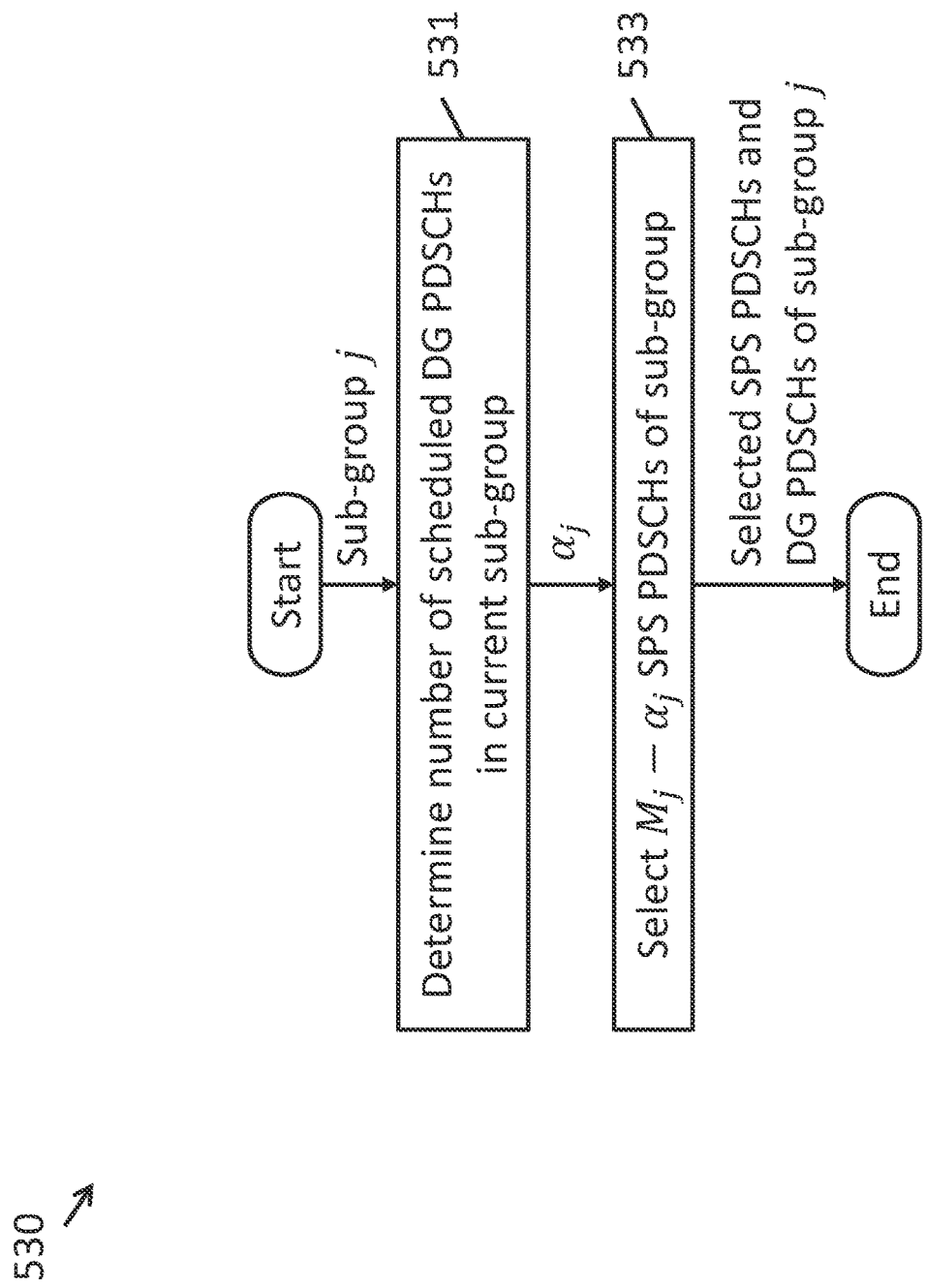
FIG. 5B is a flowchart of a method for selecting overlapping PDSCHs in a sub-group to decode or receive according to one embodiment of the present disclosure.

In operation 530, the PDSCH selector 250 of the PDSCH manager 200 of the UE 10 selects the PDSCHs of each sub-group to be received. FIG. 5B is a flowchart of a method 530 for selecting overlapping PDSCHs in a j-th sub-group to decode or receive according to one embodiment of the present disclosure. According to some embodiments of the present disclosure, the UE selects one or more PDSCH occasions from among the PDSCH occasions within each sub-group to receive (e.g., to identify in the sets of HARQ-ACK bits in the container corresponding to the sub-group) based on the RRC configuration and/or a pre-defined occasion selection rule associated with the sub-group.

In operation 531, the PDSCH manager 200 determines a maximum number $\alpha_j$ of scheduled DG PDSCHs in each sub-group. According to some embodiments, of the present disclosure, DG PDSCHs are prioritized over SPS PDSCHs. As noted above, DG PDSCHs are scheduled by an activation received during the same slot, and one or more such DG PDSCHs may be scheduled such that they are part of a same sub-group. In circumstances where the sub-group does not include a DG PDSCH, PDSCHs are selected for reception from among the SPS PDSCH of the sub-group.

In operation 533, the PDSCH manager 200 applies the pre-defined rule or RRC configuration to select $M_j$-$\alpha_j$ candidate PDSCHs from among the remaining PDSCHs in the sub-group (e.g., the SPS PDSCH occasions) in a given sub-group j where UE may expect to receive SPS PDSCHs, where $M_j$ is the number of overlapping PDSCH occasions the UE is capable of receiving or decoding in a given sub-group j and where $\alpha_j$ is the maximum possible number of dynamic grant PDSCHs scheduled for sub-group j, as determined in operation 531. In other words, in some embodiments, the presence of one or more scheduled DG PDSCHs reduces the number of SPS PDSCHs that may be received or decoded in a sub-group, such that DG PDSCHs are always received or decoded, and it is possible that one or more SPS PDSCHs will not be received or decoded.

The number of HARQ-ACK containers $M_j$ can be configured by a radio resource control (RRC) message or determined by a pre-defined rule (e.g., according to the configured TDRA table) and the number of candidate occasions within the j-th sub-group. For example, the number of HARQ-ACK containers $M_j$ may depend on the capabilities of the UE, such as the number of overlapping PDSCHs the UE is capable of receiving (e.g., based on the number of pipelines in the radio 12 and/or the baseband processor 14 for receiving multiple PDSCHs and/or buffering received PDSCHs for later processing). Each sub-group may have a different value $M_j$.

In various embodiments of the present disclosure, the UE selects which SPS PDSCHs UE to receive or decode according to the SPS configuration index (e.g., based on lowest index), periodicity (e.g., highest periodicity), and so on. In case of SPS configuration index, according to one embodiment of the present disclosure, the UE receives or decodes the $M_j$-$\alpha_j$ SPS PDSCHs having the lowest SPS configuration indices. However, embodiment of the present disclosure are not limited thereto and other criteria may be used to select which of the SPS PDSCHs are to be received.

Accordingly, in operation 530, the PDSCH manager 200 selects DG PDSCHs (if any) and SPS PDSCHs (as constrained by $M_j$-$\alpha_j$) of each sub-group to be received or decoded.

As one example, assuming $M_j$=1 containers or sets of HARQ-ACK bits per sub-group, and no DG PDSCH scheduled in each sub-group, if lowest configuration index is chosen to determine the PDSCHs UE is expected to decode, then, referring to the example shown in FIG. 4, the PDSCH manager 200 selects and decodes SPS config #0 410 in sub-group #0 430 and SPS config #4 in sub-group #1 431.

As another example, still assuming no DG PDSCH, assuming $M_0$=2, $\alpha_0$=0, $M_1$=1 and $\alpha_1$=0, the PDSCH manager 200 sets or reserves two containers for sub-group #0 430 to report two sets of HARQ-ACK bits (because $M_0$=2 and $\alpha_0$=0 and therefore $M_0$-$\alpha_0$=2-0=2) for two SPS receptions among the four SPS occasions (SPS config #0 410, SPS config #1 411, SPS config #2 412, and SPS config #3 413) in sub-group #0 430. The PDSCH manager 200 also reserves one container for sub-group 1 to report one set of HARQ-ACK bits for one SPS reception (because $M_1$=1 and $\alpha_1$=0 and therefore $M_1$-$\alpha_1$=1-0=1) among the two SPS occasions (SPS config #4 414 and SPS config #5 415) in sub-group #1 431.

Some aspects of embodiments of the present disclosure relate to resolving collisions between selected PDSCHs of different sub-groups, such as when two selected SPS PDSCHs of different sub-groups overlap, or when an SPS PDSCH of one sub-group overlaps with a DG PDSCH of another sub-group.

Figure 6:
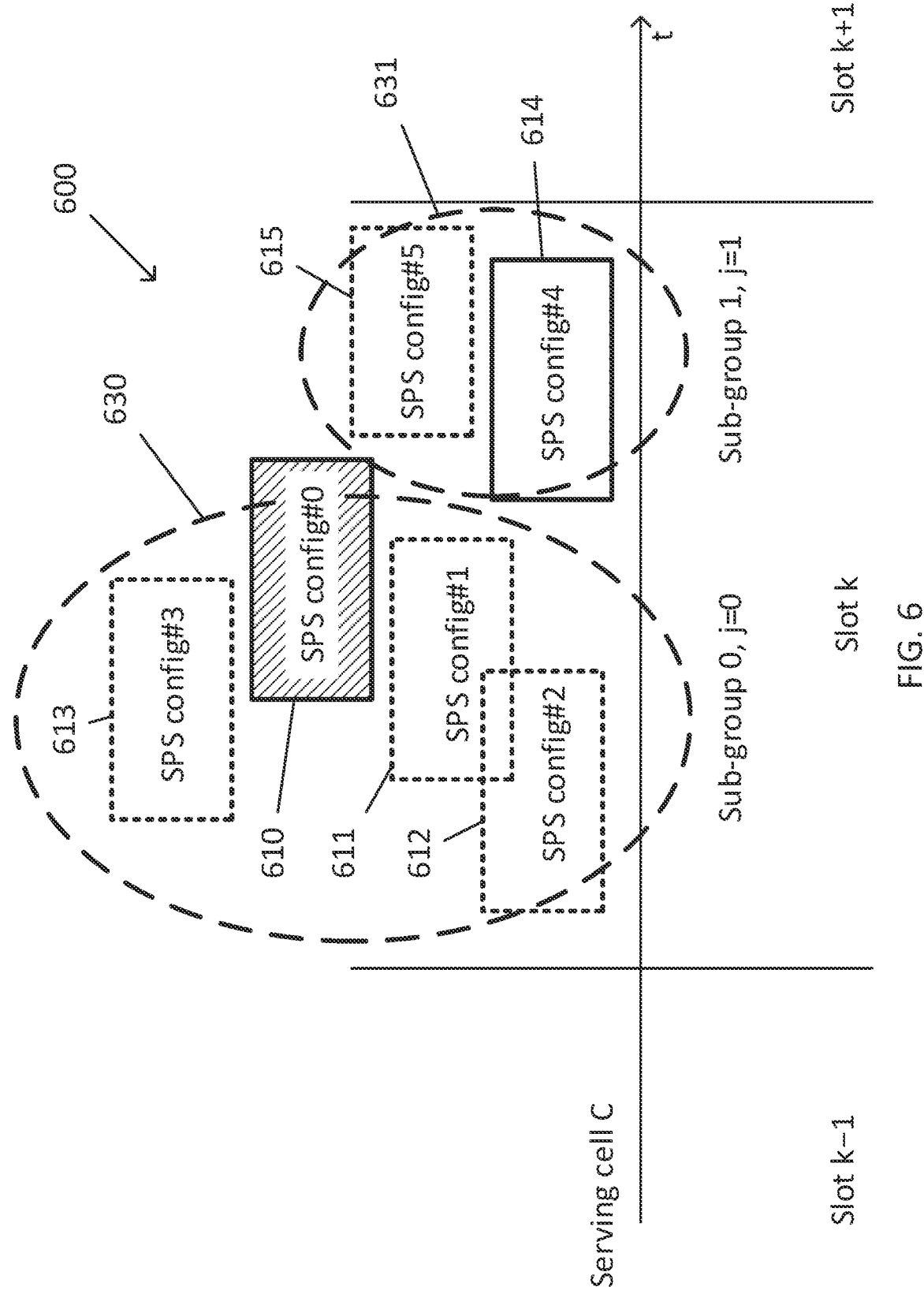
FIG. 6 is a schematic diagram illustrating a set of overlapping SPS PDSCH occasions and the corresponding type-1 hybrid automatic repeat request acknowledgment (HARQ-ACK) codebook sub-groups, where selected SPS PDSCH occasions of two different sub-groups overlap.

FIG. 6 is a schematic diagram illustrating a set of overlapping SPS PDSCH occasions and the corresponding type-1 hybrid automatic repeat request acknowledgment (HARQ-ACK) codebook sub-groups, where selected SPS PDSCH occasions of two different sub-groups overlap. The arrangement of SPS PDSCH occasions 600 in FIG. 6 is similar to that of FIG. 4, in that six SPS PDSCH occasions 600 are scheduled to occur, labeled SPS config #0 610, SPS config #1 611, SPS config #2 612, SPS config #3 613, SPS config #4 614, and SPS config #5 615. As in FIG. 4, (SPS config #0 610, SPS config #1 611, SPS config #2 612, and SPS config #3 613) are sub-grouped together in sub-group #0 630 and SPS occasions for configurations 4 and 5 (SPS config #4 614 and SPS config #5 615) are sub grouped together in sub-group #1 631, thereby forming two sub-groups. In the example shown in FIG. 6, it is assumed that $M_0$=$M_1$=1, such that one PDSCH occasion is selected in each sub-group, and that the PDSCH occasion for each sub-group is selected based on the lowest configuration index (e.g., SPS config #0 610 for sub-group #0 630 and SPSconfig #4 for sub-group #1 631), where the selected PDSCH occasions are shaded with diagonal lines, and the PDSCH occasions that were not selected are unshaded and outlined with dotted lines.

The arrangement of FIG. 6 differs from that of FIG. 4 in that SPS config #0 610 of the sub-group #0 630 overlaps in time with SPS config #4 614 of sub-group #1 631.

According to some aspects of embodiments of the present disclosure, the PDSCH manager 200 of the UE 10 is not expected to decode two overlapping PDSCHs (whether they are DG PDSCHs or SPS PDSCHs) if they belong to different sub-groups (e.g., one belongs to sub-group j and one belongs to sub-group i, where i≠j). In the case where of overlapping between the selected SPS configuration in sub-group i (e.g., lowest indexed SPS configuration in sub-group i) and the selected SPS configuration in sub-group j (e.g., the lowest indexed SPS PDSCH in sub-group j), where j≠i, the UE 10 is configured to decode only the PDSCH with the lowest configuration index among the overlapping PDSCHs of different sub-groups.

In the example shown in FIG. 6, the two overlapping or colliding PDSCHs are SPS config #0 610 for sub-group #0 630 and SPSconfig #4 for sub-group #1 631 and therefore, in some embodiments, the UE 10 is configured to decode or receive SPS config #0 610 and may drop SPSconfig #4 because SPS config #0 610 has the lower configuration index (#0 versus #4).

Figure 7:
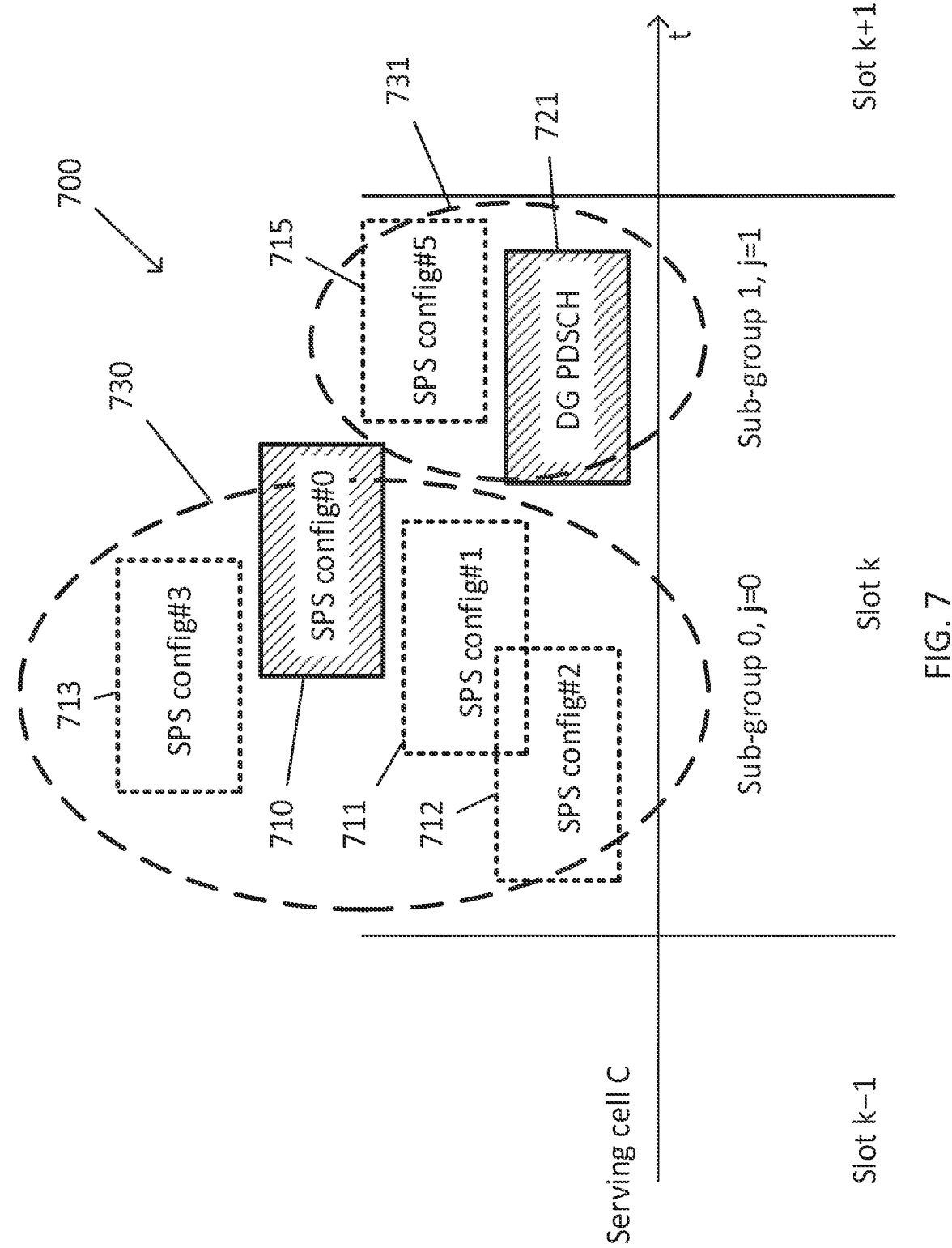
FIG. 7 is a schematic diagram illustrating a set of overlapping DG PDSCH and SPS PDSCH occasions and the corresponding type-1 hybrid automatic repeat request acknowledgment (HARQ-ACK) codebook sub-groups, where a selected SPS PDSCH occasion of one sub-groups overlaps with a DG PDSCH occasion of another sub-group.

FIG. 7 is a schematic diagram illustrating a set of overlapping DG PDSCH and SPS PDSCH occasions and the corresponding type-1 hybrid automatic repeat request acknowledgment (HARQ-ACK) codebook sub-groups, where a selected SPS PDSCH occasion of one sub-groups overlaps with a DG PDSCH occasion of another sub-group. FIG. 7 differs from the arrangement of FIG. 6 in that sub-group #1 731 includes a DG PDSCH 721 and SPS config #5 715 (e.g., SPS config #4 is omitted, for clarity). As noted above, in some embodiments of the present disclosure, DG PDSCH occasions within a sub-group are prioritized over SPS PDSCH occasions. As such, in this instance, DG PDSCH 721 is selected and SPS config #5 is not selected. However, as seen in FIG. 7, selected DG PDSCH 721 overlaps with SPS config #0 710 of sub-group #0 730.

According to some embodiments of the present disclosure, in the case of an overlap between a lowest SPS configuration in sub-group i and a DG PDSCH in sub-group j, where j≠i, the PDSCH manager 200 decodes only the DG PDSCH (e.g., prioritizing the DG PDSCH over the SPS PDSCH). In some protocols, no two DG PDSCHs can overlap, and therefore, under such protocols, it is not necessary to address this as a separate case.

Referring back to FIG. 5A, in operation 550, the PDSCH manager 200 receives or decodes the selected PDSCHs (e.g., the PDSCHs that are selected and not dropped due to inter-sub-group collisions). This may include, for example, decoding the symbols in the PDSCH to binary data 50 to be supplied to an application running on the mobile station 10.

In operation 570, the PDSCH manager 200 generates a set of HARQ-ACK bits for each of the PDSCHs selected in operation 530. These generated bits may represent an acknowledgment or ACK value corresponding to the selected and received PDSCHs of the current (j-th) sub-group.

In some embodiments of the present disclosure, the PDSCH manager 200 reserves $\alpha_j$ containers for the $\alpha_j$ DG PDSCH occasions and $M_j$-$\alpha_j$ containers for the $M_j$-$\alpha_j$ active SPS occasions. The sets of HARQ-ACK bits for the $M_j$-$\alpha_j$ SPS PDSCHs are appended to the sets of HARQ-ACK bits for any DG PDSCHs in the sub-group.

In some embodiments of the present disclosure, in case of a SPS PDSCH not decoded according to the above two cases of overlap with PDSCHs of different sub-groups, the PDSCH manager 200 reports a set of HARQ-ACK bits for the SPS PDSCH that is not received (or "dropped") indicating a negative acknowledgement or NACK value.

In some embodiments of the present disclosure, in the case of other HARQ-ACK codebooks, such as a type-2 HARQ-ACK codebook (see, e.g., 3GPP Technical Specification 38.213), which SPS PDSCHs a PDSCH manager 200 decodes in a group of overlapping SPS PDSCHs is determined in accordance with the above discussion, and the UE 10 reports HARQ-ACK bits for every decoded SPS PDSCH. If a SPS PDSCH is dropped due to collision with a DG PDSCH, HARQ-ACK bit(s) of SPS PDSCH may be still reported by appending the HARQ-ACK bits of the SPS PDSCH to the HARQ-ACK bits of the DG PDSCHs.

In operation 590, the PDSCH manager 200 generates a HARQ-ACK codebook for the current slot and for the selected PDSCHs. As noted above, a HARQ-ACK codebook according to embodiments of the present disclosure includes one or more sub-groups corresponding to different groups of overlapping PDSCHs. Each sub-group may include a set of HARQ-ACK bits for one or more active PDSCHs in the sub-group. In some embodiments, at least one of the sub-groups includes a plurality of sets of HARQ-ACK bits, each set of HARQ-ACK bits corresponding to one of a plurality of active PDSCHs in the sub-group.

The generated HARQ-ACK codebook for the current slot may then be transmitted to the base station or gNB 20 to acknowledge receipt of the one or more PDSCHs of the slot.

A method according to one embodiment of the present disclosure for determining which SPS PDSCHs of a slot to decode in the case where the slot does not have a DG PDSCH scheduled is presented as pseudocode below:

Input: N SPS PDSCHs in slot with N SPS configuration indices I={1, . . . ,N} and corresponding time-domain resource allocations.

Output: Decoded SPS PDSCHs

Step 0) Make the set of survived SPS PDSCHs indices as I={1, . . . , N}

Step 1)

While (There are at least two SPS PDSCHs in I that overlap in time):

Step 1-0) Determine the set of PDSCH sub-groups from I. Let L be the determined number of sub-groups. Each sub-group i=1, . . . ,L contains a number of SPS PDSCH indices chosen.

Step 1-1) For each sub-group remove all the SPS PDSCHs except the one with the lowest configuration index.

Step 1-2) Update the set of SPS PDSCH indices I to only include the lowest indices of sub-groups in Step 1-1)

Accordingly, some aspects of embodiments of the present disclosure relate to systems and methods for receiving multiple overlapping PDSCHs in a same sub-group of a slot. In more detail, some aspects of embodiments of the present disclosure relate to determining or selecting which PDSCHs of a given sub-group are received or decoded, some aspects of embodiments of the present disclosure relate to determining which PDSCHs are received or decoded when PDSCHs of different sub-groups overlap, and some aspects of embodiments of the present disclosure relate to a HARQ-ACK codebook having a format that supports acknowledging more than one PDSCH in a given sub-group.

Figure 8:
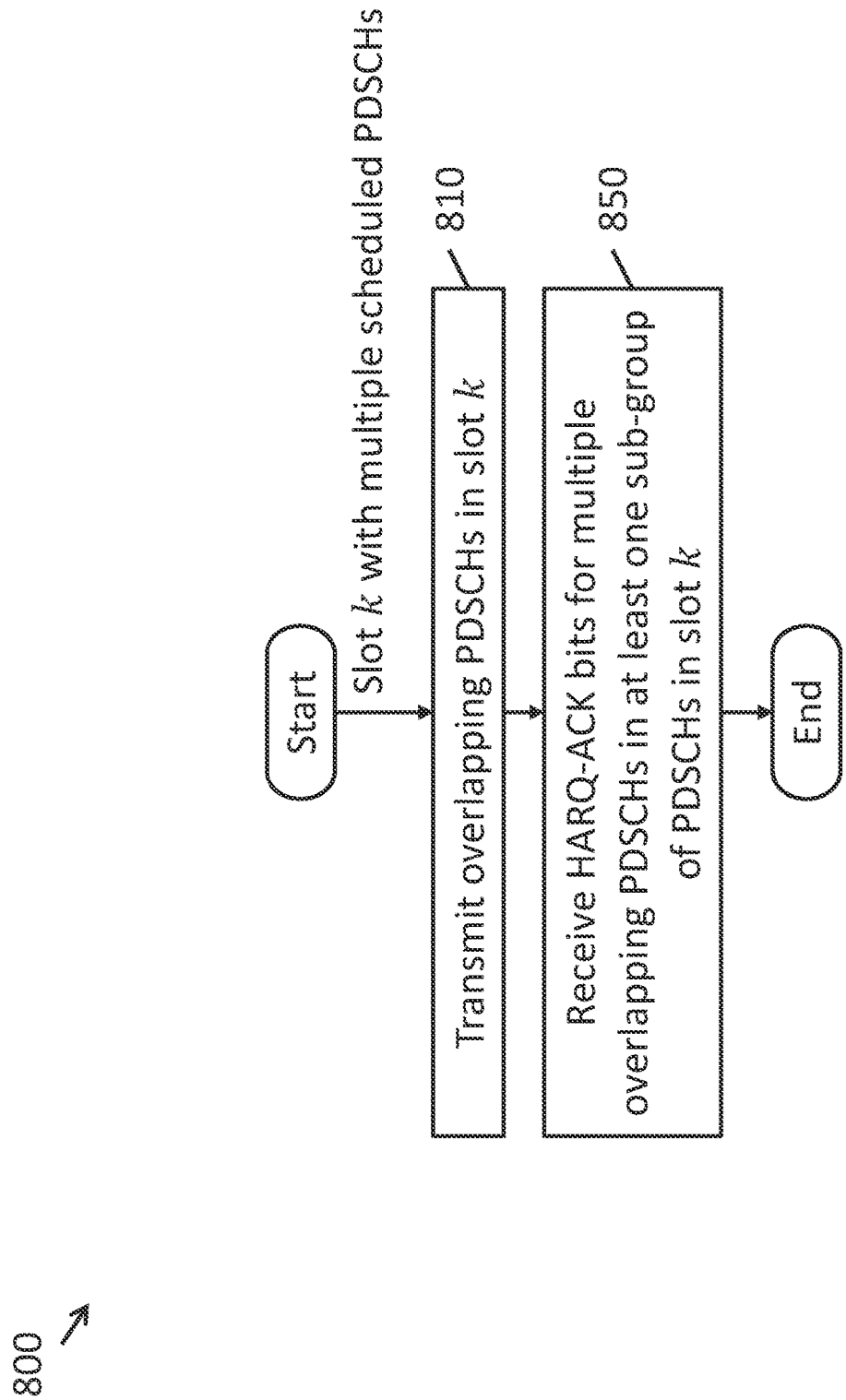
FIG. 8 is a flowchart of a method for transmitting multiple overlapping PDSCHs in a slot and receiving a hybrid automatic repeat request acknowledgment (HARQ-ACK) for multiple overlapping PDSCHs in at least one sub-group of the PDSCHs in the slot according to one embodiment of the present disclosure.

FIG. 8 is a flowchart of a method for transmitting multiple overlapping PDSCHs in a slot and receiving a hybrid automatic repeat request acknowledgment (HARQ-ACK) for multiple overlapping PDSCHs in at least one sub-group of the PDSCHs in the slot according to one embodiment of the present disclosure. As shown in FIG. 8, in operation 810, a base station 20 transmits multiple overlapping PDSCHs (e.g., two or more SPS and/or DG PDSCHs) to a mobile station or user equipment 10. These overlapping PDSCHs may form one or more sub-groups as discussed above (e.g., based on overlap in time with a PDSCH having an earliest last symbol). In operation 850, the base station 20 receives a HARQ-ACK from the mobile station or user equipment 10, where the HARQ-ACK includes sets of HARQ-ACK bits for multiple overlapping PDSCHs in the same sub-group of at least one sub-group of PDSCHs in the slot (e.g., where at least one of the sub-groups has overlapping PDSCHs, and where the HARQ-ACK bits acknowledge at least two of the overlapping PDSCHs in the sub-group).

As noted above, in some embodiments of the present disclosure, the base station or gNB 20 tracks the scheduled SPS and DG PDSCHs for the slot (e.g. slot k) and predicts which PDSCHs will be decoded by the UE 10, because the rules used by the UE 10 to select PDSCHs (e.g., in operation 530) are deterministic and set by pre-defined occasion selection rules and/or rules defined in radio resource control (RRC) messages. Accordingly, in some embodiments of the present disclosure, the base station or gNB 20 selectively transmits PDSCHs only in the SPS occasions that the UE 10 is predicted to receive or decode, based on these occasion selection rules and/or rules defined in the RRC messages, as described above.

User Equipment Physical Downlink Shared Channel (PDSCHs) Processing Time

As discussed above, when receiving or decoding multiple actual overlapping PDSCH receptions (DG PDSCH or SPS PDSCH) in a given sub-group, hardware constraints (e.g., processing constraints) on the UE 10 may prevent the UE 10 from processing all of the received PDSCHs within a standard processing time (e.g., from the end of the PDSCH to the next HARQ-ACK). In cases where the UE is unable to process all of the received PDSCH within the standard processing time, the UE may not be able to transmit the HARQ-ACK to the base station before a timeout period based on the standard processing time. As such, some aspects of embodiment of the present disclosure relate to systems and methods that set constraints such that the processing time for PDSCHs is maintained, and some aspects of embodiments of the present disclosure relate to a systems and methods implementing relaxed PDSCH processing timelines (e.g., relaxed timeout periods at the base station) in accordance with the number of received PDSCHs.

Some embodiments of the present disclosure relate to the case of a basic UE that is generally capable of processing one PDSCH at a time.

One embodiment of the present disclosure relates to handling overlapping active SPS occasions within each sub-group. In this embodiment, the UE 10 assumes that there will be up to one active SPS PDSCH occasion in a sub-group of PDSCH candidates, where the sub-group is determined based on overlapping PDSCH candidates according to type-1 HARQ-ACK codebook construction in 3GPP Technical Specification 38.213.

One embodiment of the present disclosure relates to overlapping active SPS occasions with up to 1 actual SPS PDSCH reception. In this embodiment, the UE assumes that there will be up to one actual SPS PDSCH reception in a set of overlapping SPS PDSCH occasions according to the type-1 HARQ-ACK codebook sub-group. In other words, this embodiment assumes that no more than one actual SPS PDSCH reception can overlap in time or frequency. In other words, in case of multiple overlapping SPS PDSCHs in a sub-group, in this embodiment the UE only receives or decodes one of the SPS PDSCHs determined according to RRC configuration, e.g. the SPS PDSCH with lowest SPS configuration index.

One embodiment of the present disclosure relates to overlapping active SPS occasions and dynamic grant PDSCHs with up to 1 actual SPS or DG PDSCH reception. In this embodiment, the UE assumes that there will be up to one actual PDSCH reception (SPS PDSCH or DG PDSCH) in a set of overlapping SPS PDSCH occasions and DG PDSCHs in a type-1 HARQ-ACK codebook sub-group. In other words, this embodiment assumes that no more than one actual SPS or dynamic PDSCH receptions can overlap in time or frequency.

Some embodiments of the present disclosure relate to the case of UE that is capable of processing more than one PDSCH at a time.

One embodiment of the present disclosure relates to UE capable of handling overlapping active SPS occasions. In this embodiment, the UE reports (e.g., to the base station or gNB 20) a number $N_{sps}^{overlap}$ indicating the number of SPS PDSCHs UE is capable of processing in a type-1 codebook sub-group. In this embodiment, the UE expects the actual number of SPS PDSCH receptions in a sub-group of PDSCH occasions to be less than or equal to $N_{sps}^{overlap}$.

One embodiment of the present disclosure relates to UE capable of handling Overlapping active SPS and dynamic occasions). In this embodiment, like in the above embodiment, the UE reports a number $N_{sps,dg}^{overlap}$ indicating the total number of SPS and DG PDSCHs the UE is capable of processing in a type-1 codebook sub-group. As above, the UE expects the sum of the actual number of SPS PDSCH receptions and DG PDSCHs in a sub-group of occasions, to be less than or equal to $N_{sps,dg}^{overlap}$.

One embodiment of the present disclosure relates to setting or allocating a number of HARQ-ACK containers per sub-group based on the reported UE capabilities $N_{sps}^{overlap}$ and $N_{sps,dg}^{overlap}$ as defined above.

One embodiment of the present disclosure relates to relaxing processing time in case of overlapping SPS/DG PDSCH receptions. In case of processing of N>1 received PDSCH (SPS PDSCH or DG PDSCH) in a type-1 HARQ-ACK codebook sub-group, the PDSCH processing time for each reception is increased by $d_i$ for PDSCH reception i, i=1, . . . N. (Without the increase, the processing time follows Rel-15 PDSCH processing time rules, i.e. corresponding to N=1.) In other words, the base station allocates additional time for each of the N PDSCH receptions of the sub-group. (In this embodiment, all active SPS occasions are counted as received PDSCHs). As a result, the base station increases its corresponding timeout for receiving ACK/NACK bits of the PDSCH receptions of the sub-group in the corresponding PUCCHs.

The amount of increase $d_i$ depends on the configured TDRA table and hardware resources for processing the PDSCH occasions within the sub-group. The amount of increase $d_i$ may also depend on the sub-carrier spacing of the serving cell.

While aspects of embodiments of the present disclosure are described above in the context of a PDSCH manager 200 operating on a UE or mobile station 10, embodiments of the present disclose are not limited thereto and various algorithms described herein may also be implemented at a base station (or g node B) 20.

As such, aspects of embodiments of the present disclosure relate to systems and methods for processing semi-persistently scheduled (SPS) or dynamically scheduled (or dynamic grant or DG) channels such as physical downlink shared channels (PDSCHs). In more detail, aspects of embodiments of the present disclosure relate to systems and methods for handling circumstances where multiple channels overlap in time and/or frequency, for determining which of the multiple overlapping channels should be received or decoded, and for acknowledging receipt of multiple overlapping channels, such as through the use of a HARQ-ACK codebook that can represent sets of HARQ-ACK bits for multiple overlapping channels in a sub-group of channels.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for processing multiple overlapping channels comprising:
   receiving, at a mobile station comprising a processor and a memory, a plurality of physical downlink shared channels (PDSCH) in a slot;
   determining, by the processor of the mobile station, one or more sub-groups of PDSCHs in the slot;
   selecting, by the processor of the mobile station, one or more PDSCHs of at least one sub-group of the one or more sub-groups;
   generating, by the processor of the mobile station, acknowledgement bits of the selected one or more PDSCHs of the at least one sub-group; and
   transmitting, by the mobile station, the acknowledgement bits of the one or more PDSCHs of the at least one sub-group to a base station.

2. The method of claim 1, wherein the acknowledgment bits are included in two or more containers corresponding to the at least one sub-group, the two or more containers being included in a hybrid automatic repeat request acknowledgment (HARQ-ACK) codebook.

3. The method of claim 1, wherein the acknowledgement bits comprise an acknowledgment (ACK) or a negative acknowledgment (NACK) value corresponding to one of the selected one or more PDSCHs.

4. The method of claim 1, further comprising decoding, by the mobile station, the selected one or more PDSCHs.

5. A method for processing multiple overlapping channels comprising:
   transmitting, by a base station comprising a processor and a memory, a plurality of physical downlink shared channels (PDSCH) in a slot, the PDSCHs being organized into one or more sub-groups of PDSCHs; and
   receiving, by the base station and from a mobile station, an acknowledgment (ACK) or a negative acknowledgment (NACK) for one or more overlapping PDSCHs in at least one of the one or more sub-groups in the slot.

6. The method of claim 5, further comprising:
   receiving, by the base station and from the mobile station, a report of a number of overlapping semi-persistently scheduled (SPS) PDSCHs that the mobile station is capable of receiving in a sub-group; and setting, by the base station, a number of acknowledgment containers per sub-group in the acknowledgement based on the number of overlapping SPS PDSCH receptions that the mobile station is capable of receiving in a sub-group.

7. The method of claim 5, further comprising:
receiving, by the base station and from the mobile station, a report of a number of overlapping semi-persistently scheduled (SPS) PDSCHs and dynamic grant (DG) PDSCHs that the mobile station is capable of receiving in a sub-group; and
setting, by the base station, a number of acknowledgment containers of the sub-group in the acknowledgement based on the number of overlapping PDSCH receptions that the mobile station is capable of receiving in a sub-group.

8. The method of claim 5, further comprising:
determining, by the base station, which of the one or more overlapping PDSCHs of the at least one sub-group will be decoded by the mobile station, and
setting, by the base station, a timeout period between the transmitting the one or more overlapping PDSCHs of the at least one sub-groups and the receiving the acknowledgement based on a processing time based on the determined one or more overlapping PDSCHs.

9. The method of claim 8, wherein the determined one or more overlapping PDSCHs comprises N of PDSCHs, where N is greater than 1, and
wherein the base station allocates additional processing time for each of the N PDSCHs of the at least one sub-group.

10. The method of claim 5, wherein the acknowledgment comprises a hybrid automatic repeat request acknowledgment (HARQ-ACK) codebook comprising containers corresponding to the one or more overlapping PDSCHs of the at least one sub-group of the slot.

11. A method for processing multiple channels, comprising:
receiving, at a mobile station comprising a processor and a memory, a plurality of physical downlink shared channels (PDSCH) in a slot;
determining, by the processor of the mobile station, one or more sub-groups of PDSCHs in the slot;
selecting, by the processor of the mobile station, one or more overlapping PDSCHs of a j-th sub-group of the one or more sub-groups; and
decoding, by the mobile station, the selected one or more overlapping PDSCHs.

12. The method of claim 11, wherein the selecting the one or more overlapping PDSCHs comprises:
determining a number $\alpha_j$ of scheduled dynamic grant (DG) PDSCHs in the j-th sub-group;
selecting the scheduled DG PDSCHs; and
selecting $M_j$-$\alpha_j$ PDSCHs from among remaining PDSCHs of j-th sub-group, where $M_j$ is the number of overlapping PDSCH occasions the mobile station is capable of decoding in the j-th sub-group.

13. The method of claim 12, wherein $\alpha_j$ is zero.

14. The method of claim 12, wherein $\alpha_j$ is greater than or equal to one.

15. The method of claim 12, wherein each of the remaining PDSCHs is a semi-persistently scheduled (SPS) PDSCH, each SPS PDSCH being associated with a corresponding SPS configuration index, and
wherein the selecting the $M_j$-$\alpha_j$ PDSCHs from among the remaining PDSCHs of j-th sub-group is based on the corresponding SPS configuration index.

16. The method of claim 15, wherein each SPS PDSCH is activated by a corresponding scheduling activation downlink control information (DCI),
wherein the corresponding SPS configuration index of each SPS PDSCH is assigned based on an order in which the corresponding scheduling activation DCI of the SPS PDSCH is transmitted to the mobile station, and
wherein the $M_j$-$\alpha_j$ PDSCHs are selected from among the remaining PDSCHs of j-th sub-group based on SPS configuration index.

17. The method of claim 15, further comprising:
selecting, by the processor of the mobile station, a semi-persistently scheduled (SPS) PDSCH of a i-th sub-group of the one or more sub-groups, where i≠j, wherein the selected SPS PDSCH of the i-th sub-group overlaps with an SPS PDSCH of the j-th sub-group from among the selected one or more overlapping PDSCHs of the j-th sub-group;
comparing, by the processor of the mobile station, the corresponding SPS configuration index of the SPS PDSCH of the j-th sub-group and the corresponding SPS configuration index of the SPS PDSCH of the i-th sub-group; and
dropping, by the processor of the mobile station, one of the SPS PDSCH of the j-th sub-group and the SPS PDSCH of the i-th sub-group based on the comparison.

18. The method of claim 12, wherein the selecting the $M_j$-$\alpha_j$ PDSCHs from among the remaining PDSCHs of j-th sub-group is based on a radio resource control (RRC) configuration.

19. The method of claim 11, further comprising selecting, by the processor of the mobile station, a dynamic grant (DG) PDSCH of a i-th sub-group of the one or more sub-groups, where i≠j, wherein the selected DG PDSCH of the i-th sub-group overlaps with an SPS PDSCH of the j-th sub-group from among the selected one or more overlapping PDSCHs of the j-th sub-group; and
dropping, by the processor of the mobile station, the SPS PDSCH of the j-th sub-group.

20. The method of claim 11, further comprising selecting, by the processor of the mobile station, a semi-persistently scheduled (SPS) PDSCH of a i-th sub-group of the one or more sub-groups, where i≠j, wherein the selected SPS PDSCH of the i-th sub-group overlaps with a dynamic grant (DG) PDSCH of the j-th sub-group; and
dropping, by the processor of the mobile station, the SPS PDSCH of the i-th sub-group.

* * * * *